United States Patent [19]

Stocchiero

[11] Patent Number: 5,663,009
[45] Date of Patent: Sep. 2, 1997

[54] COVERING ELEMENT FOR THE CONNECTORS CONNECTING THE POLES OF THE ELEMENTS FORMING ELECTRIC ACCUMULATORS

[76] Inventor: Olimpio Stocchiero, via Kennedy, 5 - 36050 Montorso Vicentino (VI), Italy

[21] Appl. No.: 681,571

[22] Filed: Jul. 23, 1996

[30] Foreign Application Priority Data

Dec. 9, 1994 [IT] Italy .................. VI94A0178

[51] Int. Cl.$^6$ .................................. H01M 2/20
[52] U.S. Cl. ........................... 429/65; 429/121
[58] Field of Search ................ 429/65, 121, 120

[56] References Cited

U.S. PATENT DOCUMENTS 3,884,725  5/1975  Schmidt .
3,956,576  5/1976  Jensen et al. .................. 429/65 X
4,206,273  6/1980  Mandil .
4,239,836  12/1980  Picciolo ........................ 429/65

FOREIGN PATENT DOCUMENTS 2824463  1/1979  Germany .

Primary Examiner—John S. Maples
Attorney, Agent, or Firm—Watson Cole Stevens Davis, P.L.L.C.

[57] ABSTRACT

The invention discloses an element (1; 201) to cover the connectors (2) connecting the poles (31, 32) of the elements of an electric accumulator (3) and consists of a hollow body (10) which receives the body (20) of one of said connectors (2). At least one part of said hollow body (10) presents a shaped profile (17) suited to realize an elastically flexible structure which allows the variation of the length of said covering element (1), whenever it is strained by an axial force (18). Said variation of length allows the coupling of the same covering element (1; 201) with connectors (2) presenting lengths differing from one another.

14 Claims, 3 Drawing Sheets

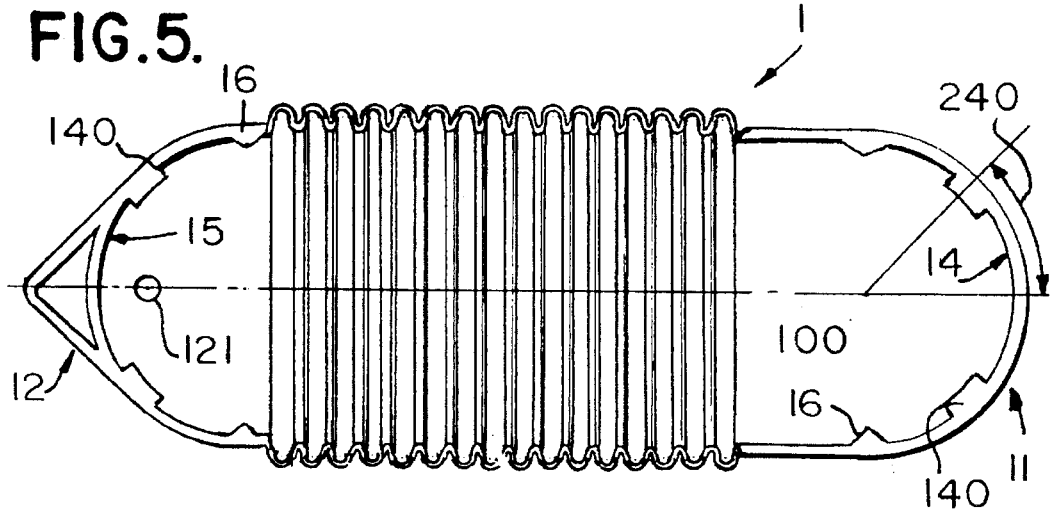
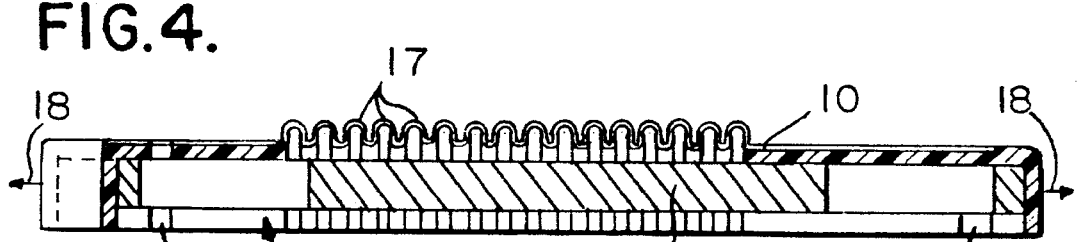
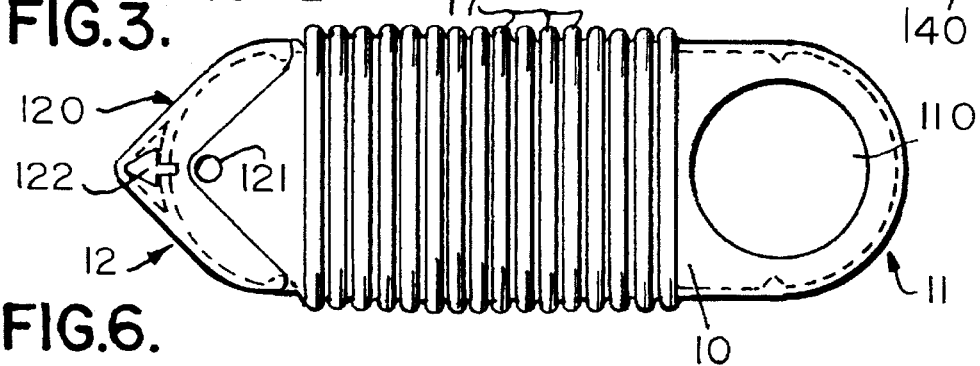
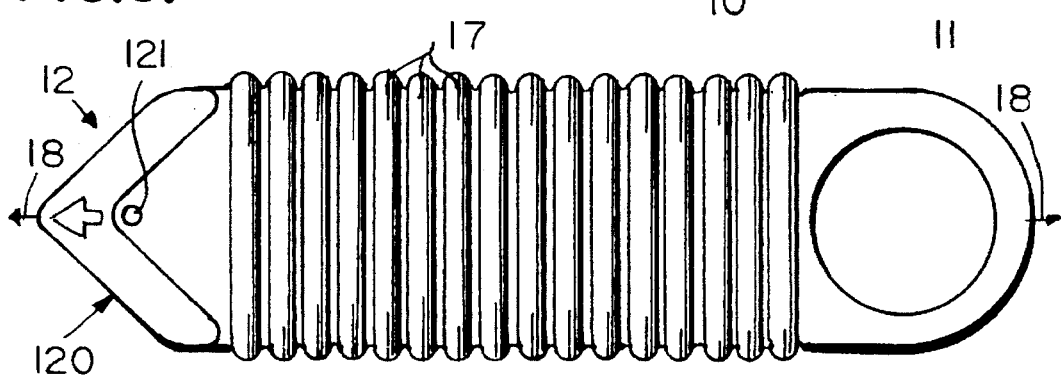

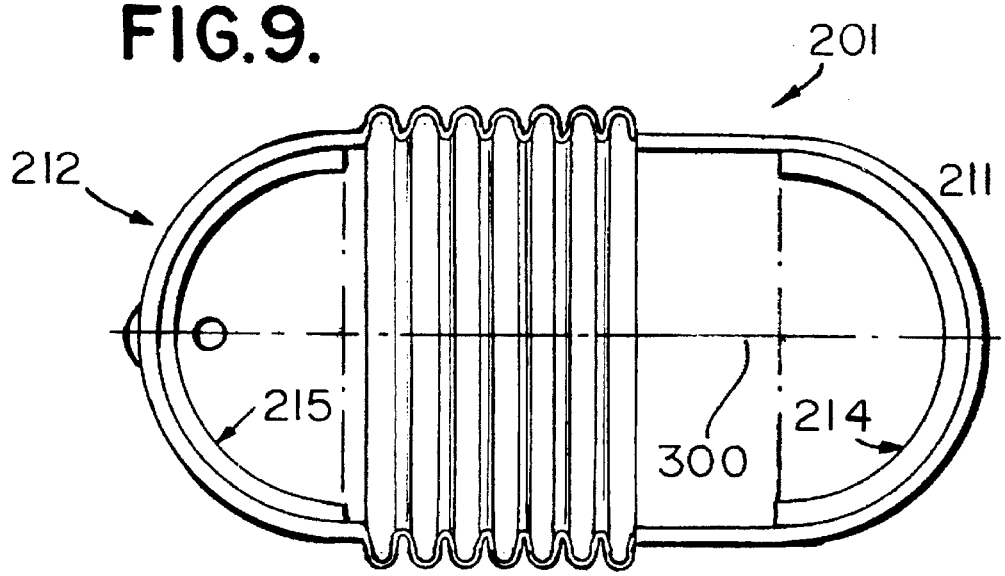
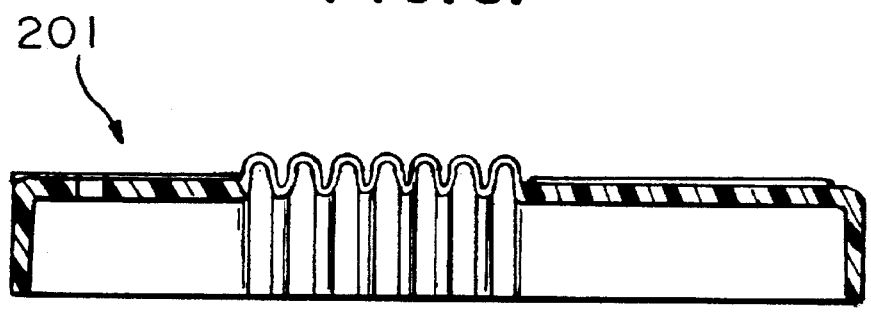
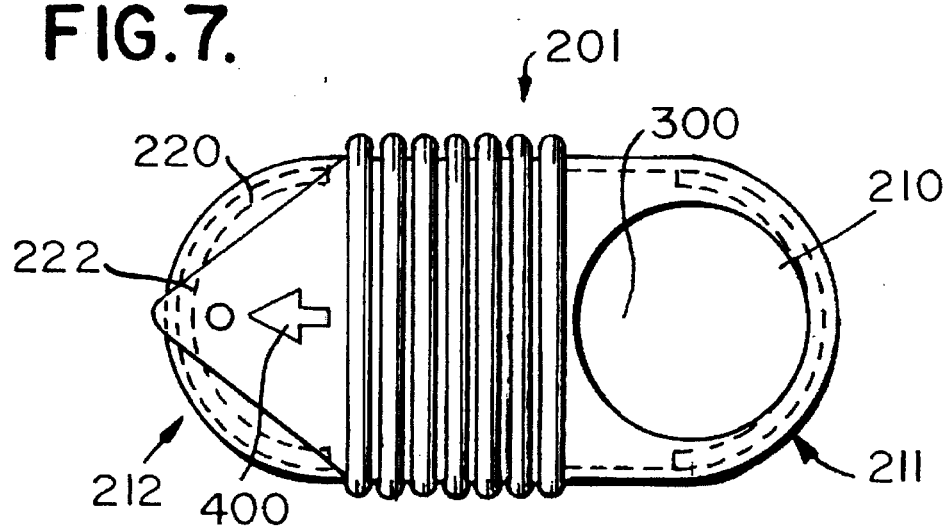

COVERING ELEMENT FOR THE CONNECTORS CONNECTING THE POLES OF THE ELEMENTS FORMING ELECTRIC ACCUMULATORS

BACKGROUND OF THE INVENTION

1. Field of the Invention

The invention concerns an element to cover the connectors connecting the poles of the elements forming electric accumulators.

2. General State of the Art

As it is known, electric accumulators consist of a plurality of elements which are connected with each other in series by means of connectors which realize the electric connection between poles belonging to adjacent elements.

Said connectors, which essentially consist of a bar made of lead provided with holes at its extremity which match the corresponding poles of the elements, are protected by covering elements which essentially consist of hollow lids made of plastic or insulating material which are removably coupled by pressure or a snap with the connectors themselves.

The connectors are realized in different lengths and, consequently, the battery manufacturers must keep in stock covering elements presenting different lengths, each one suited to couple with a connector of the corresponding length.

It is understood that this fact implies the necessity of keeping large supplies of covering elements in stock and, therefore, to bear the relative costs.

SUMMARY OF THE INVENTION

In the attempt of overcoming such an inconvenience, covering elements have been developed, consisting of two extremity elements longitudinally sliding in relation to a central body to which they are coupled. In this way, the same covering element can be applied, within a restricted range of lengths, to connectors presenting different lengths.

Such a solution, if on one hand it reduces the amount of sizes of the covering elements to be kept in stock, on the other hand it requires the construction of a larger number of moulds since, for each covering element, it is necessary to realize at least one mould for the construction of the extremity elements and one mould for the construction of the central body to which said extremity elements are coupled.

Moreover, since said covering elements consist of more parts co-operating with one another, these must be joined together before applying the covering element to the corresponding connector and this fact means additional working times for the operators, as compared with the time which is strictly necessary to apply the covers to the connectors.

It is with the purpose of overcoming such inconveniences that the present invention is disclosed.

In particular, one purpose of the invention is to obtain an element to cover the connectors for the connection of the poles of the accumulators, which can be applied to connectors having lengths differing from one another.

Another purpose is for said covering element to be composed of only one element.

Another purpose is for said covering element, after the assembling to the relative connector, to unmistakably indicate the position of the positive pole and of the negative pole.

Not the last purpose is for said covering element to permit the reading of electric measurements on the poles, without removing it.

The described purposes are achieved by the realisation of an element to cover the connectors connecting the poles of the elements of an electric accumulator which, in accordance with the main claim comprises a hollow body suited to receive the body of one of said connectors, said hollow body presenting its extremities suited to match the corresponding extremities of the body of said connector one being connected with the positive pole and the other with the negative pole of adjacent elements belonging to said accumulator and is characterized in that at least one part of said hollow body presents a shaped profile suited to realize an elastically flexible structure which allows the variation of the length of said covering element, whenever said covering element is strained by an axial force, said variation of length being suited to allow the coupling of the same covering element with connectors presenting lengths differing from one another.

According to one preferred embodiment, the essentially central area of the hollow body of said covering element presents an undulated profile having an essentially sinusoidal development which defines a bellows structure presenting a high degree of axial elastic flexibility.

Advantageously, the covering element according to the invention can quickly be applied to the corresponding connector since it is obtained in a single piece.

With as much advantage, the covering element according to the invention reduces the amount of the size variations of the covering elements to be kept in stock.

BRIEF DESCRIPTION OF THE DRAWINGS

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description and from the drawings, wherein:

FIG. 3 shows the detail of the covering element according to the invention in a top view;

FIG. 4 shows the covering element of FIG. 3 in a longitudinal section, coupled with the corresponding connector;

FIG. 5 shows the covering element according to the invention seen from below;

FIG. 6 shows the covering element according to the invention in a top view and extended;

FIG. 7 shows a top view of a different embodiment of the covering element according to the invention;

FIG. 8 shows the cutaway lateral view of the different embodiment of the covering element represented in FIG. 7;

FIG. 9 shows the different embodiment of the covering element according to the invention represented in FIG. 7.

DESCRIPTION OF THE PREFERRED EMBODIMENT

Figure 1:
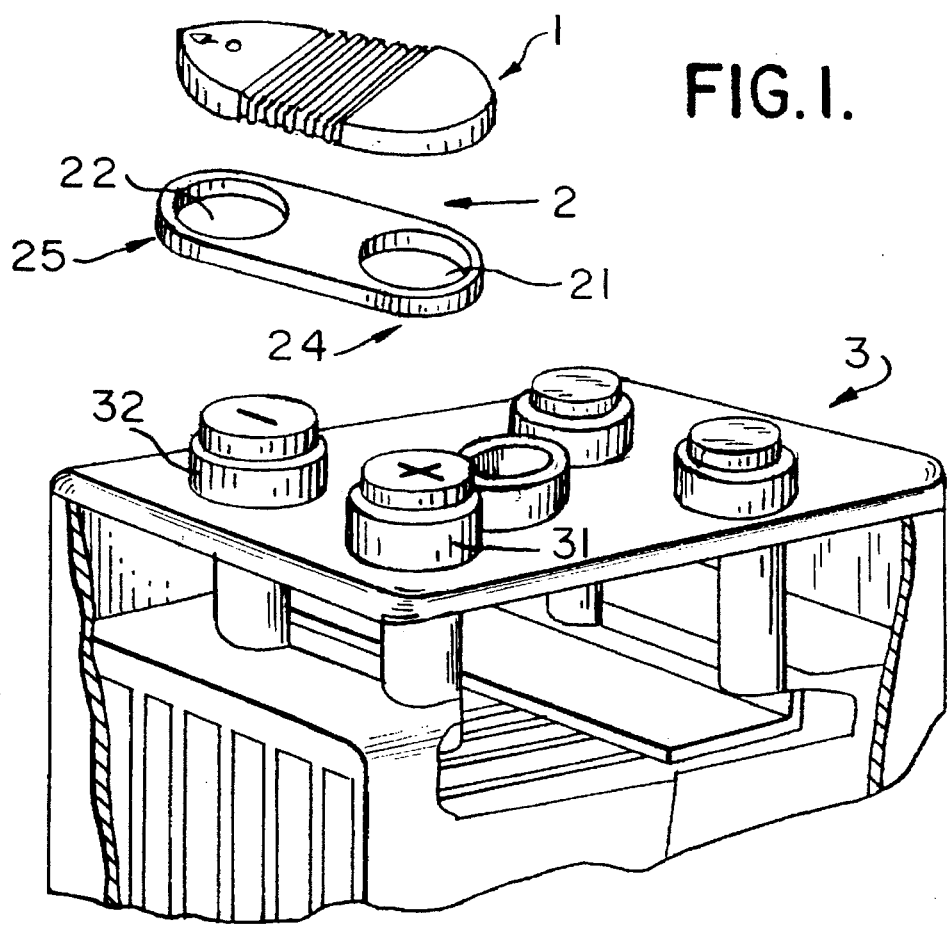
FIG. 1 shows in an axonometric exploded representation the covering element according to the invention suited to be coupled with the connector for the connection of the poles of the elements of an underlying accumulator.

As can be observed in FIG. 1, the covering element according to the invention, indicated as a whole with 1, is applied to a connector 2 which presents two circular annular holes 21 and 22 which match the positive pole 31 and the negative pole 32 respectively, of two adjacent elements of an electric accumulator, indicated as a whole with 3, which, in this way are connected in series.

Obviously, the connector 2 can also connect in series elements belonging to accumulators differing from one another.

Figure 2:
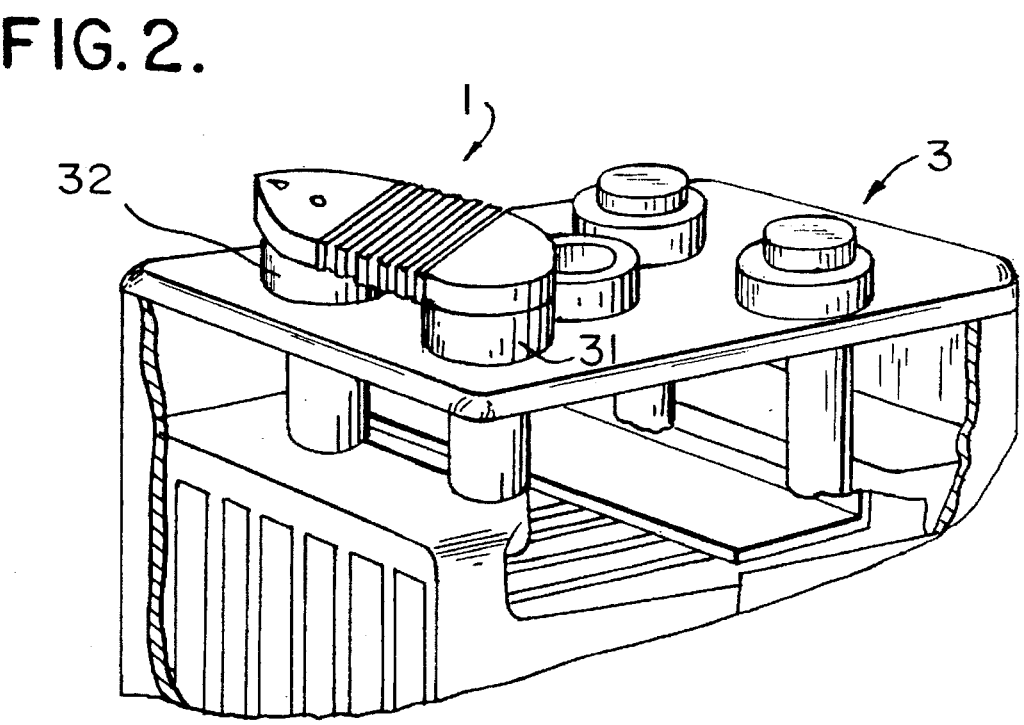
FIG. 2 shows the covering element of FIG. 1 applied to the corresponding connector, the latter being connected with the poles of the accumulator.

Said connector 2, once it has been coupled with the poles 31 and 32, is welded to them and then covered, as can be observed in FIG. 2, by applying to it the covering element 1.

As can be observed in FIG. 3, the covering element 1 comprises a body 10 which presents a first extremity 11 and a second extremity 12 placed opposite to each other which, as can be observed in FIG. 5, have profiles 14 and 15 respectively, presenting the shape essentially of an arch of a circle which allow them to match the corresponding profile of the extremities 24 and 25 of said connector 2.

It can also be observed that said covering element 1 is essentially hollow and lodges inside the body 20 of said connector 2, against which it laterally contrasts by means of the lateral centering projections 16. Moreover, the body 10 of said covering element 1 also presents, as can be observed in FIG. 4, retaining tabs 140 facing the interior and arranging themselves under the connector 2 so as to ensure the stability of the coupling. Said tabs 140 are arranged at an angle 240 of 45° in relation to the axis of said covering element.

The body 10 of said covering element presents a shaped profile having an essentially sinusoidal undulated development which defines a bellows structure 17 which gives to the covering element characteristics of axial elastic flexibility, whenever it subjected to tensile axial stresses 18.

Such a flexibility facilitates the application of the covering element to the connector 2 and also permits its application to other connectors which are longer than connector 2. In fact, by applying to the covering element 1 a tensile axial stress 18, it essentially acquires the configuration represented in FIG. 6 which permits to apply it to connectors which are longer than the connector 2 represented in FIG. 1.

Moreover, after the extension and the application to the connector, the elastic return of the bellows 17 causes the cover to be securely locked to the connector, said locking being further improved by the insertion of the tabs 140 under the connector.

It can be observed that one of the extremities of said covering element, in this case the second extremity 12, has the external configuration 120 of an acute angle facing away from the covering element and an arrow symbol 122 is impressed on it which stands for the direction of the current which, conventionally, goes from the positive pole to the negative pole. If, conventionally, it is decided to always connect the second extremity 12, shaped as an acute angle 120, to the negative pole 32 of the element of the accumulator, the positions of all of the positive and negative protected by the application of the covering element.

The second extremity 11, as can be observed in the FIGS. 3 and 6, presents a curved shape and is provided with an area 110 for receiving a symbol, a mark or similar.

Said covering element presents, in correspondence with said second extremity 12, a hole 121 which permits the insertion of the terminal of an electric measurement gauge for monitoring the voltage or the intensity of the current. It is pointed out that in a different embodiment, there may be eventually two holes on the covering element, one in correspondence with each extremity, being, however, a single hole fully sufficient, since the other terminal of the measuring gauge is inserted in the corresponding single hole of the other covering element arranged on the connector of the adjacent element.

According to a different embodiment represented in the FIGS. 7, 8 and 9, the covering element according to the invention, indicated as a whole with 201, presents both the first extremity 212 and the second extremity 211 having the shape of a curved inner profile 215 and 214, respectively. Even in such a different embodiment, said second extremity 211 is provided with an area 210 for receiving a symbol, a mark or similar, while the first extremity 212 presents a profile 222 in the shape of an acute angle on its upper surface 220. Such a profile is comprised inside the curved profile of said first extremity 212, on the upper surface 220 of which it is obtained and oriented along the axis 300 of the element itself.

On such an upper surface 220, is also impressed an arrow 400 pointed in the same direction as the acute angle 222.

On the basis of what has been said, it is understood that the covering element, in whichever different embodiment it is constructed, reaches all the proposed purposes.

First of all, the purpose of making possible for the same covering element to be coupled to connectors presenting different lengths has been achieved. This is done by exploiting the flexibility due to the particular configuration with which the body of the covering element is obtained.

Moreover, the particular shape of one of the extremities of the covering element makes it possible to unmistakably recognize the polarity of the pole of the accumulator arranged in correspondence with said extremity.

Moreover, since the covering element according to the invention is obtained in a single component, the number of items to be kept in stock is reduced to the minimum as compared with covering elements manufactured with several pieces and equivalent with it. In this way, the assembling operations to be performed before applying the cover to the connectors, are also eliminated.

During the construction, the covering element according to the invention may undergo modifications consisting, for instance, of a different shape of the profile of its extremities and of the bellows which realizes its flexibility.

However, it is to be understood that all said variations and other possible ones fall within the scope and spirit of the invention.

I claim:

1. A cover for connectors of various lengths adapted to couple adjacent positive and negative poles of an electric accumulator comprising:

an elongated hollow body having opposite ends and formed with an opening in a major side for receiving such connector therein, said elongated hollow body being otherwise closed and formed with an elastically flexible central portion comprising a bellows allowing axial variation in the length of said cover between the opposite ends whenever the cover is strained by an axial force, said variation in length for allowing the cover to extend over coupling elements of differing lengths.

2. The cover of claim 1 wherein the bellows is formed with a sinusoidal profile having a relatively high degree of flexibility in the axial direction and adapted to allow the extension of an elastic return of the cover.

3. The cover of claim 1 wherein the opening has curved end portions corresponding to a curve profile of ends of said connectors.

4. The cover of claim 1 wherein said covering element has an outer profile formed as an acute angle.

5. The cover of claim 1 having a closed major surface opposite the opening formed of 9 triangular profile aligned with the axis of the cover.

6. The cover of claim 4 wherein the acute angle converges outwardly of the body.

7. The cover of claim 1 wherein at least one end portion of the body is formed with a through hole for alignment with a terminal of the accumulator.

8. The cover of claim 1 wherein said body includes tabs formed in the opening for engaging side portions of the connector.

9. The cover of claim 1 wherein the ends of said body include a slanted portion relative to the axis.

10. The cover of claim 9 wherein the slanted portion is at an angle of about 45°.

11. The cover of claim 1 wherein the body is formed with a closed major surface having an integral arrow aligned with the axis formed therein.

12. The cover of claim 1 wherein the body is formed with a closed surface for receiving indicia thereon.

13. The cover of claim 1 further including centering projections for contacting the connector.

14. A cover for connectors of various lengths adapted to couple adjacent positive and negative poles of an electric accumulator comprising:

an elongated hollow body having opposite ends and formed with an opening in a major side for receiving such connector therein, said elongated hollow body formed with an elastically flexible central portion, comprising a bellows allowing axial variation in the length of said cover between the opposite ends whenever the cover is strained by an axial force, said variation in length for allowing the cover to extend over coupling elements of differing lengths.

* * * * *